UNITED STATES PATENT OFFICE.

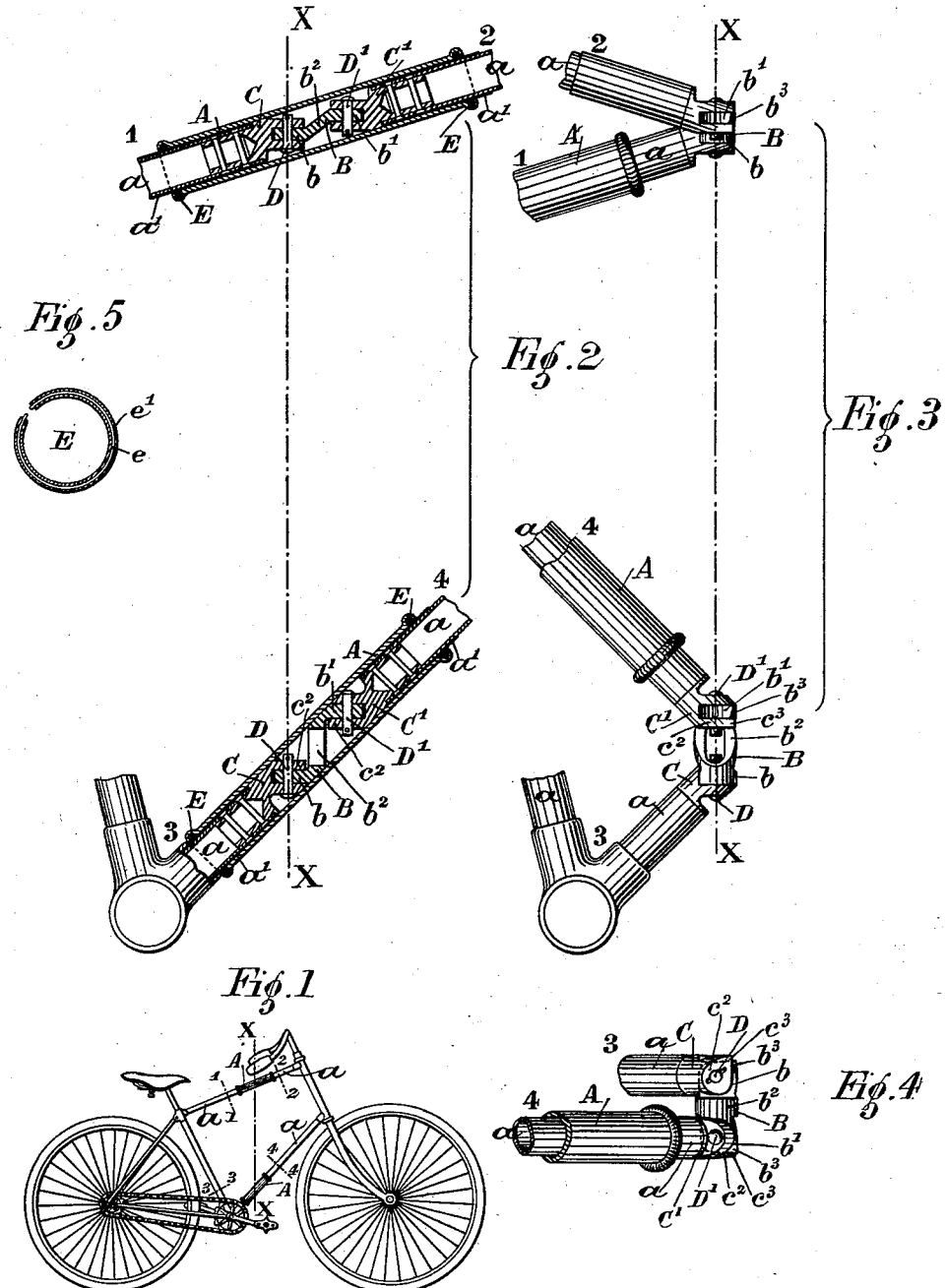

ALPHONSE HOFBECK, OF ISSY, FRANCE.

FOLDING JOINT FOR BARS OR RODS.

SPECIFICATION forming part of Letters Patent No. 531,121, dated December 18, 1894.

Application filed July 12, 1894. Serial No. 517,272. (No model.) Patented in France December 21, 1893, No. 234,963.

*To all whom it may concern:*

Be it known that I, ALPHONSE HOFBECK, a citizen of the Republic of France, residing at Issy, in the said Republic, have invented a new and useful Improvement in Pivotal Joints for Folding Structures, (for which I have obtained a patent in France, No. 234,963, dated December 21, 1893,) of which the following is a specification.

This invention relates to a joint for a bar or rod which permits it to be folded about an axis forming an oblique angle with the length of the said bar or rod or, in other words, in such manner that the two parts of the bar or rod which are normally in a right line, may, when folded, form an angle one with the other.

The invention is particularly suitable for the frame of a bicycle for it permits the folding about the same axis of the two branches of such frame, which are inclined the one relatively to the other, in such manner that the hind wheel may be brought near the front wheel, yet preserving a perfect rigidity for the frame when it is straightened.

I will describe by way of example this special application of my invention but it will be easy to see that it is applicable without essential modification in all cases in which it might be desirable to fold on a given angle solid or hollow rods which should be rigid when they are straightened.

Figure 1 in the accompanying drawings represents a bicycle of which the frame is articulated according to my system. Fig. 2 represents on a larger scale and in section parts of the frame comprised between the lines 1—1, 2—2, 3—3, 4—4, of Fig. 1. Fig. 3 represents a side view of the same part of the frame folded. Fig. 4 is a plan view of the lower branch of the frame when it is folded. Fig. 5 is a detail view of a friction band which I employ with my system of articulation.

Similar letters and numerals of reference designate corresponding parts in all the figures.

The folding of the two branches 1—2 and 3—4 of the bicycle is made about the common axis indicated by the line X—X in Figs. 1 and 2, such axis being oblique to the length of the said branches but each of the branches is maintained rigid in its normal condition by a sleeve A which covers its articulation. When it is desired to fold the frame these sleeves are slid upon the branches 1—2 and 3—4 in such manner as to disengage the two articulations.

Each of the articulations is made by the aid of a bent link B which is articulated at its two extremities by means of pivots $D\ D'$ parallel with the axis of articulation X—X upon two bearings $C\ C'$ rigidly affixed to the adjacent extremities of the two elements or sections $a\ a$ of the bars which are to be folded one upon the other. This link B is formed of a cylindrical piece of steel in such manner that when the articulated joint is straightened, the contour of said link fits exactly the interior surface of the covering sleeve A. The said link comprises three parts $b\ b'\ b^2$, that is to say, the two terminal portions $b\ b'$ presenting the form of flat ears of which the faces are parallel with each other but in different planes perpendicular to the axis of articulation X—X and which are pierced with holes for the passage of the pivots $D\ D'$ parallel with this axis, and the intermediate portion $b^2$, of which the inclination or the angle which they form relatively to these ears depends upon the angle which the axis X—X makes with the bar to be folded as may be understood by reference to Fig. 2. This part $b^2$ may be hollowed in order to make it light. The ears $b\ b'$ are rounded on one side. On the other they are angular, as shown at $b^3$ in Figs. 3 and 4. In this way the rotation of the link relatively to the pieces $C\ C'$ can only be made in one direction, the shoulder formed by the angle at $b^3$ preventing the rotation in the other direction. The said ears are received between two branches of a fork formed in the bearing C or $C'$ which is also formed of a cylindrical piece of steel. The branches $c^2$ of the forks of articulation are also rounded on one side and angular on the other as shown at $c^3$ in Fig. 4. Nevertheless if it be desired to make the fold in both directions the angular stops $b^3$ and $c^3$ may be suppressed but that would impair the rigidity of the straightened bar. It may be remarked that owing to this mode of construction the articulation is very solid and very firm and that in consequence the rigidity of the bicycle frame is in no way diminshed.

Fig. 4 shows clearly that the angle of rotation of one of the parts of the bar relatively to the other is one hundred and eighty degrees, that is to say, a rotation of ninety degrees about the pivot D and a rotation of ninety degrees about the pivot D'.

The sliding sleeve A which covers the articulation when the bar is intended to remain rigid is hollowed out within its ends to form throats for the reception of friction rings E to prevent scratches upon the enamel or nickel-plating of the bar. This ring is formed of a split ring of steel *e* covered with any soft matter such as hemp or india-rubber. The said ring may be maintained in one or other of its positions upon the folding bar by means of any kind of stop whatever; screw, bayonet fastening, or spring bolt. Preferably this sleeve instead of sliding directly upon the bar may slide upon bands *a'* (see Fig. 2) formed upon the bar to serve as friction surfaces. These bands may also serve to consolidate the assemblage of the bearings C C' with the said bar. This assemblage may be secured in any suitable manner; for example, by means of rivets, screws or bolts, or by brazing, soldering or screwing. The bearings C C' may be solid or be hollowed as shown in the drawings in order to make them lighter. While I prefer to make the articulation pieces B and C C' of steel, I may make them of any other metal or suitable material.

What I claim as my invention is—

1. The combination with two sections of a bar or rod, of an articulating link the terminal portions of which connected by two parallel pivots with the two said sections respectively are perpendicular to said pivots and the intermediate portions of which form an angle between said terminal portions, and a sleeve for receiving said link and portions of said sections, substantially as herein described.

2. The combination with two sections of a bar or rod, of a bent articulating link the terminal portions of which receiving two pivots forming connections with said two sections respectively, are parallel with each other in different planes and perpendicular to said pivots, and a sleeve for receiving said link and portions of said sections, substantially as herein described.

3. The combination with two sections of a bar or rod having at their adjacent ends forks set at corresponding angular inclinations, a link comprising terminal ears which are parallel with each other but in different planes and which have an angular inclination to the intermediate portion of the link, and a sleeve for receiving said link and portions of said sections, substantially as herein described.

4. In a structure comprising two bars or rods which when straight stand at an inclination to each other, the combination of two sections in each bar or rod, two links each forming a connection between the two sections of one of said bars or rods, two pivots for articulating each link with the two sections of its respective bar or rod and two sleeves one for receiving each link and the adjacent portions of the sections of its respective rod, the said pivots being all parallel with each other but those of each rod forming an angle with its respective rod different from that formed between the other rod and its pivot, substantially as and for the purpose herein described.

In witness whereof I have hereunto set my hand in the presence of two subscribing witnesses.

ALPHONSE HOFBECK.

Witnesses:
 ALCIDE FABE,
 EDWARD P. MACLEAN.